(12) United States Patent
Weis et al.

(10) Patent No.: US 7,948,447 B2
(45) Date of Patent: May 24, 2011

(54) MOBILE DISPLAY

(75) Inventors: Judd Warren Weis, Wyoming, OH (US); Gilles Bariguian, Anieres (CH)

(73) Assignee: The Procter & Gamble Company, Cincinnati, OH (US)

( * ) Notice: Subject to any disclaimer, the term of this patent is extended or adjusted under 35 U.S.C. 154(b) by 992 days.

(21) Appl. No.: 11/061,426

(22) Filed: Feb. 18, 2005

(65) Prior Publication Data

US 2006/0187141 A1  Aug. 24, 2006

(51) Int. Cl.
*G09G 5/00* (2006.01)
(52) U.S. Cl. .......................... 345/1.1; 434/429; 434/433
(58) Field of Classification Search ............ 345/1.1–1.3; 434/433, 249, 365, 377, 429, 430
See application file for complete search history.

(56) References Cited

U.S. PATENT DOCUMENTS

| | | | |
|---|---|---|---|
| 4,241,777 A | 12/1980 | Wenger et al. | |
| 5,131,448 A | 7/1992 | Miller | |
| 5,137,297 A | 8/1992 | Walker | |
| 5,261,824 A | 11/1993 | Ness | |
| 5,375,899 A | 12/1994 | Wright | |
| 5,398,463 A | 3/1995 | Wright | |
| 5,595,414 A | 1/1997 | Dulnig | |
| 5,749,615 A | 5/1998 | Itson | |
| 6,250,929 B1 * | 6/2001 | Kolb et al. | 434/238 |
| 6,343,264 B1 | 1/2002 | Fenton | |
| 6,368,113 B1 * | 4/2002 | Unger et al. | 434/429 |
| 6,718,669 B1 | 4/2004 | Hayes | |
| 2001/0032152 A1 | 10/2001 | Khosla | |
| 2001/0056396 A1 | 12/2001 | Goino | |
| 2002/0036617 A1 | 3/2002 | Pryor | |
| 2003/0070770 A1 | 4/2003 | Nussdorf | |
| 2005/0021356 A1 * | 1/2005 | Thompson | 705/1 |
| 2005/0069860 A1 | 3/2005 | Clark et al. | |
| 2005/0181347 A1 * | 8/2005 | Barnes et al. | 434/350 |
| 2005/0190072 A1 * | 9/2005 | Brown et al. | 340/825.36 |

FOREIGN PATENT DOCUMENTS

| | | |
|---|---|---|
| EP | 034 435 A2 | 8/1981 |
| JP | 2005-42383 | 2/2005 |
| WO | WO 98/22929 | 5/1998 |
| WO | WO-01/45004 A1 | 6/2001 |
| WO | WO-03/022108 A1 | 3/2003 |
| WO | WO-03/023169 A1 | 3/2003 |

OTHER PUBLICATIONS

EPO Search Report, dated May 27, 2010, 8 pages.

* cited by examiner

*Primary Examiner* — Kimnhung Nguyen
(74) *Attorney, Agent, or Firm* — Megan C. Hymore; James E. Oehlenschlager; Gary J. Foose

(57) ABSTRACT

A mobile, multi-room display environment. The display environment has a first room, the first room having a first set of sensory cues, and a second room, the second room having a second set of sensory cues substantially different from the first set of sensory cues. The first and second rooms are designed for temporary use and can be easily disassembled for transport from one location to another.

13 Claims, 2 Drawing Sheets

MOBILE DISPLAY

FIELD OF THE INVENTION

This invention relates to mobile displays designed to be assembled and disassembled for portable, temporary use.

BACKGROUND OF THE INVENTION

Manufacturers of consumer products are successful when they understand what consumers desire in their products. Understanding of consumer needs, desires and habits can help a manufacturer design products having certain desirable features, often in ways that are not immediately obvious to the consumer. Likewise, retailers and other sellers of manufactured products may not have the understanding that the manufacturer has with respect to consumer products. Although manufacturers routinely have sales representatives to make sales calls to the retail customers, time and space constraints often make it difficult to provide the retail customer with the information necessary to fully appreciate the consumer understanding behind a certain product. Such constraints can often hinder sales in a competitive market for consumer goods.

Therefore, there is a continuing, unaddressed need for a method or device for more effectively communicating insights related to consumer understanding to a retail seller of manufactured consumer products.

Also there is a continuing, unaddressed need for a method of facilitating discussions between manufacturers and retailers to discuss consumer needs, joint business planning, technology reviews, and the like.

Additionally, there is a continuing, unaddressed need for a method or device that can be cost-effectively utilized at multiple locations to better reach multiple retail customers.

Further, there is a continuing, unaddressed need for a method or device that can be easily tailored to meet the needs of a variety of sales environments, including varying customers, varying geographical regions, and varying products.

SUMMARY OF THE INVENTION

A mobile, multi-room display environment is disclosed. The display environment has a first room, the first room having a first set of sensory cues, and a second room, the second room having a second set of sensory cues substantially different from the first set of sensory cues. The first and second rooms are designed for temporary use and can be easily disassembled for transport from one location to another.

DETAILED DESCRIPTION OF THE INVENTION

Figure 1:
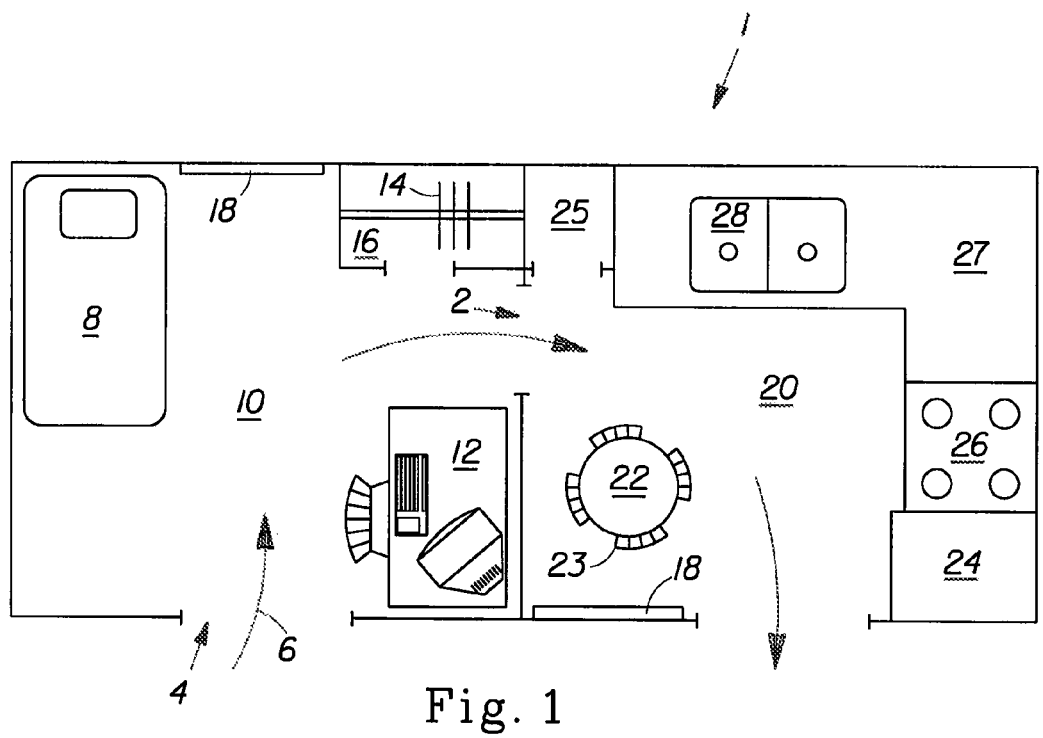
FIG. 1 shows a floor plan of one embodiment of a mobile display of the present invention.

The mobile display of the present invention is a mobile display environment for communicating the benefits of manufactured products with the objective of increasing sales to customers, including retail customers, either directly or through retail outlets such as department stores, grocery stores, hardware stores, and the like. In one embodiment, the mobile display is a multiple-room display, in which each room can be tailored for a certain "look and feel" to aid communication of products, business planning, technology review, and the like.

By "mobile" as used herein is meant that the display is easily portable from one place to another. The mobile display can be set up for temporary use and disassembled for easy transport to another location. The mobile display can comprise modular components such that the display can be assembled and disassembled quickly, and with a minimal requirement for tools.

In one embodiment, the mobile display can be transported on or in one or more skids, pallets, or crates. Depending on the requirements for transport, the number and size of the skids, pallets, or crates can be chosen depending on the equipment available for transport and assembly. For example, the mobile display can be disassembled into component parts that can be secured to skids or pallets that are moveable by standard fork lift or pallet jack equipment. In one embodiment, the mobile display can be disassembled into component parts that can be crated into crates moveable by human labor, such as by lifting by one or two persons.

In one embodiment, the mobile display is cratable or palletizeable. By "cratable" as used herein is meant that the mobile display is designed to be disassembled and the component parts placed into a crate or crates for storage or transport for re-assembly at a different time or location. Crates can be any of known crates as are used for shipping products. Crates can be made of wood, metal, or combinations thereof, as is well known in the art and typified by those used by companies who specialize in the area of crating, such as Custom Crating, Inc., Arlington, Tex. or All American Crating, Inc., Orlando Fla. Crating can include crating for air or sea shipment in freight containers. In one embodiment, crates are sized for convenient loading or unloading by forklift or pallet jack. In one embodiment, crates are less than three cubic meters in volume, and can weigh less than 450 kg (about 1000 pounds) when loaded. In one embodiment, crates are less than five cubic meters in volume, and can weigh less than 2250 kg (about 5000 pounds) when loaded. In one embodiment, crates are less than ten cubic meters in volume, and can weigh less than 4,500 kg (about 10,000 pounds) when loaded.

By "palletizeable" as used herein is meant that the modular components of the mobile display are designed to be secured to a pallet for storage and transport for re-assembly at a different time or location. Pallets can be made of wood, plastic, metal, or combinations thereof, as is well known in the art and typified by those used by companies who specialize in the area of pallets and pallet containers, such as Buckeye Diamond Logistics, Inc., South Charleston, Ohio or Handling Innovations, LLC, Cornelius, N.C. In one embodiment, pallets can have a loading surface area of from about one to about ten square meters, and can support at least about 450 kg (about 1000 pounds) when loaded.

The mobile display can be used to communicate to wholesale purchasers of retail products. When assembled for use, the mobile display can be arranged, decorated, and otherwise tailored or configured to recreate a desired environment, preferably an environment closely resembling the environment in which the consumer of retail products would spend time. By creating an environment closely resembling the environment in which users of such products live, or in which such products are used, the product manufacturer can better communicate to prospective wholesale purchasers the benefits of, and the research behind, such products. By making the environment mobile, it can be easily transported to locations convenient for the wholesale purchasers to reach. For example, the mobile display can be palletized or crated for transport by air, sea, or land. Land shipment can be by truck, barge (e.g., on inland waterways), or train. In one embodiment, the mobile display can be containerized for shipment by air, sea, or land in a single container adapted for transfer by crane or forklift from one to another mode of shipment.

The mobile display can be assembled for use outside, or inside a building. For example, the mobile display can be set up in a parking lot at a retail purchaser's place of business. In one embodiment, the mobile display can be set up for use inside a building, such as in a convention center, an auditorium, or in a hotel room. In one embodiment the mobile display comprises one room and can be assembled for use inside another room, such as a hotel room or office. For multiple-room embodiments, each room of the mobile display can be assembled in a separate room.

While the invention is suitable for displaying and communicating beneficial attributes of any product for sale from a manufacturer, the embodiment described herein is a mobile multi-room display for communicating product attributes of consumer products and packaged goods, and in particular, products used by consumers for use on their person, for their families, or in their home. Specifically, the mobile display illustrated herein as one embodiment of the invention can be useful for communicating beneficial product understanding and attributes of disposable absorbent products, such as disposable diapers, sanitary napkins, pantiliners, tampons, and the like.

Because the mobile display is portable and transportable, it can be reused at many locations and for many purposes. For example, the mobile display can be made from modular components, such as quick connect/disconnect components as is common in the field of modular displays for sales booths, trade shows, and temporary exhibits. Structures for portable components, such as are used in sales display booths are known in the art, such as those made by Nomadic Display, Springfield, Va., or Absolutely Portable, Santa Clara, Calif.

In general, the mobile display of the present invention is designed to help communicate insight which the product manufacturer has gleaned from consumers and to facilitate discussion between the product manufacturer and a prospective buyer with regard to such insight. It can also be used for facilitating sessions with an expert facilitator, including vision sharing, joint development opportunities, joint business planning, and/or technology reviews. For example, the mobile display can be transported to a buyer's place of business where representatives of the product manufacturer, e.g., sales people or product researchers, can take buyers through the display environment. The display serves to immerse the buyer in the environment of the consumer. Consumer insights can be better communicated in such an environment having sensor cues specific to the targeted consumer.

As used herein, the terms "cue" and "sensory cues" refer to the prompts, signals, or indications that are sensed by the eyes, ears or nose, as well as touch, with respect to an immediate environment. Therefore, the various visible objects in a room are visual cues; heard sounds are audible cues; and, odors and smells are olfactory cues. Sensory cues, as used herein, refer to individual or interrelated signals that indicate to a person what environment, such as what room he or she is in, i.e., a bedroom, a kitchen, a nursery, an office, a factory floor, an operating room, a classroom and the like.

As used herein, the term room means an enclosed or semi-enclosed area that resembles an actual enclosed or semi-enclosed functionally-specific room of a house, office, store, school, hospital, or similar location. By "functionally-specific" is meant that the room is recognizable for use for a specific purpose, such as a bedroom, a kitchen, a clothing store, a play room, a shop, a garage, a basement, an office, a doctor's office, a dentist's office, a waiting room, a classroom, a laboratory, or other functionally-specific area. In the context of the present invention rooms are three-dimensional structures having a size sufficient for humans to walk through and experience as if they were in an actual room of the type being displayed.

In general, the rooms of the present invention need not be fully enclosed, or have fully functional fixtures and furnishings, but they should have the appearance as such. Therefore, the room need not have a full ceiling, but can have elements to look like a ceiling. Likewise, a room such as a kitchen need not have actual working appliances, plumbing, and the like, but only the appearance of such appliances, plumbing, and the like.

FIG. 1 shows a floor plan of one embodiment of a mobile display 1 of the present invention. As shown in FIG. 1, mobile display 1 is a multi-room display having at least a first room 10 and a second room 20. Although shown in FIG. 1 as two rooms connected by a common doorway 2B, the invention is not limited to two rooms. The mobile display can have only one room, and if there is more than one room the rooms can be separated by a distance, such as by a walkway, hallway, or other intermediate location.

Figure 2:
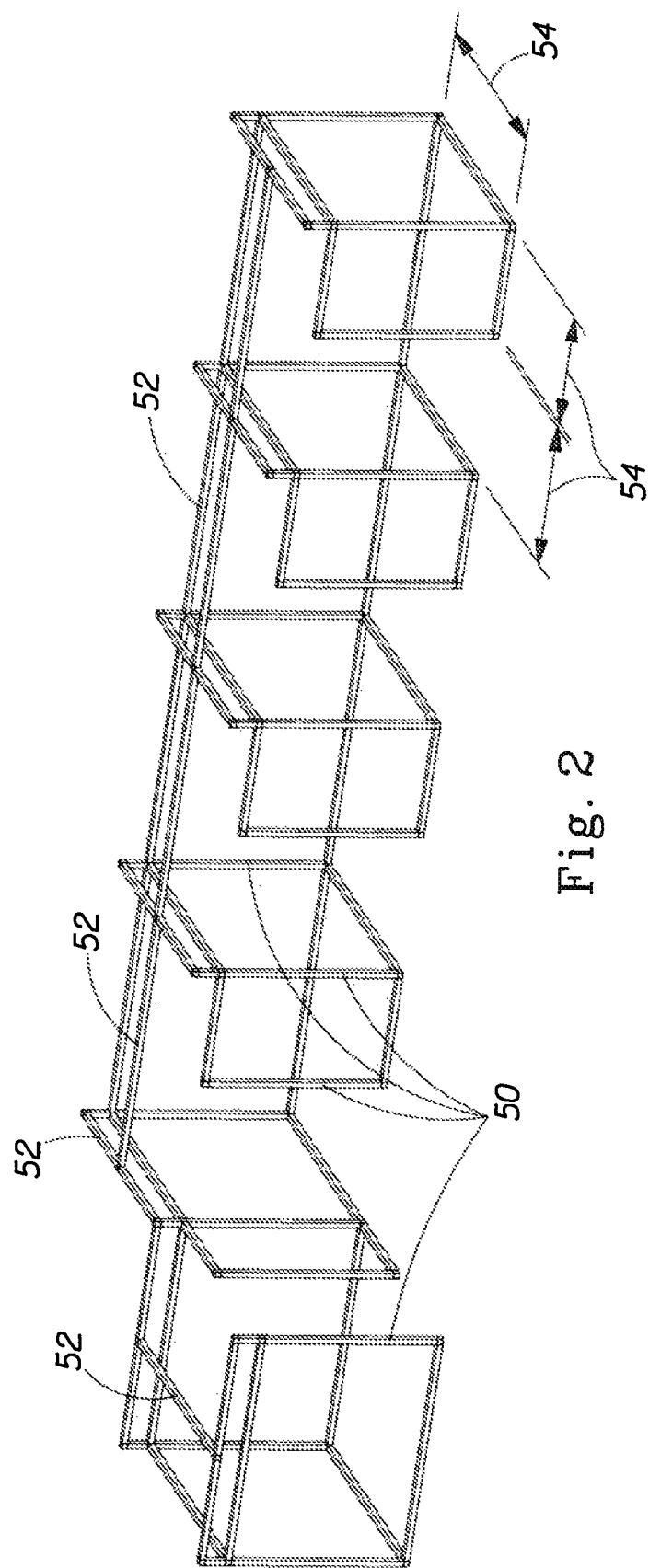
FIG. 2 shows a perspective view of the general framework of a mobile display of the present invention.

Mobile display 1 can be made of pre-fabricated panels and other structural elements that can be easily assembled and disassembled for temporary exhibition. FIG. 2 shows a representative configuration of structural components to which wall 5 panels and the like can be attached to define the rooms of the mobile display. For example, the walls 5 can comprise discrete panels of lightweight material, such as fabric-covered steel frames. Each panel can be joined by known means to lightweight columns 50 and beams 52 that can be joined by connector means, such as pinned hinges, male/female mating elements, or other means known in the art for joining the various structural members or panels into sections that make up the walls of the mobile display 1. Likewise, flooring members, including carpet 7 or tile 9 can be utilized in sections that are easily assembled and disassembled. Depending on the function of the room being displayed, and as shown below, other elements, such as beds, desks, lighting, tables, appliances, clothing, pictures, mirrors, computers, and other props can be added once the walls, floor or ceiling of the mobile display 1 is erected in place. FIG. 2 also shows representative dimensions 54 of one embodiment of the present invention.

FIG. 1 shows two rooms of a typical house in which women consumers of feminine hygiene products might live. The two rooms offer two environments typically inhabited by women in different life stages, women which can differ in their feminine hygiene needs. For example, one can enter through doorway 2A as shown by arrow 3A into first room 10, which can be a teenager's bedroom environment. Once inside the room, one is presented with a plurality of sensory cues that help one to understand the teenager's needs, desires, insecurities, and other general thoughts. In one embodiment, therefore, the invention is directed to understanding the needs of consumers in different or changing life stages. A manufacturer of consumer products can better manufacture products for sale to consumers when the manufacturer has insight into the special, perhaps unique, needs of the consumer based upon the consumer's current physical, mental, societal, and/or cultural development.

A bedroom environment can be tailored for teenage girls of various ages, nationalities, cultures, geographical locations, and other demographic considerations. In general, however, a teenager's bedroom environment can include a bed 8, which can be made or unmade, a desk 12 that might have on it a computer 13 and other electronic products, papers, pictures, and the like. In addition, a closet 16 can have hanging clothes 14 of a type popular for the time and place of display. The bedroom can have pictures, posters, music systems, mirrors, incandescent lighting, carpet or other flooring material, window treatments such as curtains, and other visual and audible cues for a typical teenager's bedroom. The bedroom can be made to look neat or cluttered, clean or messy, loud or quiet, as needed for the desired effect.

In addition to the typical bedroom sensory cues, first room 10 can have in it a means for presenting a multi-media presentation of a typical teenage girl's life, including her cares, her fears, her wants, her thoughts and her needs. For example, a flat screen monitor 18 can project video and audio information in the form of a recorded presentation of consumer data. The monitor 18 can be part of a video system permitting the playback of stored media, such as video tapes, DVD's, streaming video, or other means. By watching and hearing the presentation in the surroundings of a teenager's bedroom, the prospective buyer can more fully appreciate the depth of consumer understanding behind the product for sale. For example, a prospective wholesale buyer of feminine hygiene products can better understand the needs of a teenage girl, thereby making a better buying decision for that targeted consumer. Multi-media presentations can be facilitated by any means known in the art, including by projection from a projector onto a wall or screen. A portion of a wall of first room 10 (as well as any other rooms) can be made of a material suitable for viewing projected light images.

Second room 20 can be entered through doorway 2B as shown by arrow 3B. Second room 20 can be another room of a typical house, or it can be another environment typical of another life stage of a woman, such as the interior of a clothing store. In the embodiment shown in FIG. 1, second room 20 is a kitchen, a room in which an older woman, such as a mother, might spend a significant amount of time. The kitchen can have a table 22, chairs 23, a refrigerator 24, a pantry area 25, an oven and stove top 26, a counter top 27 and a sink 28, among other things that might be in a typical kitchen. The kitchen can include any other sensory cues that might make for a more realistic environment depending on the location, geographical region, culture, or country in which the mobile display 1 is located. For example, the flooring 9 can be typical of the region, such as tile, hardwood, or linoleum; and a dishwasher may or may not be present, and a window with window treatments can be present. Additionally, typical smells of food cooking, cleaning supplies, or other odors can be present, as well as sounds of dishes clattering, a dishwasher running.

In addition to the typical kitchen sensory cues, second room 20 can have in it a means for presenting a multi-media presentation of a typical mother's life, including her cares, her fears, her wants, and her needs. For example, a flat screen monitor 18 can project video and audio information in the form of a presentation of consumer data in a similar manner as in first room 10. By watching the presentation in the surroundings of the kitchen, the prospective buyer can more fully appreciate the depth of consumer understanding behind the product for sale. For example, a prospective buyer of feminine hygiene products can better understand the needs of an older woman such as a mother, thereby making a better buying decision for that targeted consumer. In one embodiment, the multi-media presentation is projected from an overhead projector upon a wall that serves as a screen for viewing. In one embodiment, the wall/screen is a common wall/screen with first room 10.

In the two-room embodiment shown in FIG. 1 one can leave second room 20 through door 2C as indicated by arrow 3C. In one embodiment, the flow of movement through mobile display 1 can be important as it follows a natural progression of presentation, such as through life stages of a woman. However, in general, the exact path one takes in moving through the rooms of mobile display 1 is not believed to be critical.

Other rooms can be a part of mobile display 1, such as a third room 30 and a fourth room 40. In addition to the rooms shown in FIG. 1, for example, third room 30 can simulate the inside of a clothing store. The clothing store can have sensory cues such as a rack of hanging clothing, shelves of folded clothes, pictures of models modeling clothing, racks of hanging accessories, display counters containing items for sale, wall advertising, posters, and fitting rooms. Any other typical sights, sounds, or smells associated with a clothing store for the location of display can be added. For example, music typical of the geographical region in which the display is set up can be played from overhead speakers. Telephone rings, background conversation, and "PA" announcements can be utilized.

Fourth room 40 can be an older woman's bedroom. The older woman's bedroom can include a bed, a vanity, a dresser, a closet of age-appropriate clothing, smells of candles or perfumed sachets, and the like. The sensory cues associated with an older woman's bedroom can be those typical of an older woman of the geographical region and culture in which the fourth room is being displayed. Associated smells and sounds can be added to the visual cues for a total sensory experience.

As with the first two rooms, the third and fourth rooms (as well as any others) can have a means for multi-media presentation, such as a TV, computer, or overhead projector with a screen, or flat screen monitor 18 from which the prospective buyer can more fully appreciate the depth of consumer understanding behind the product for sale. For example, a prospective buyer of feminine hygiene products in the third room 30 can better understand the needs of a young, single woman such as a college student, thereby making a better buying decision for that targeted consumer. Likewise, a prospective buyer of feminine hygiene products in the fourth room 40 can better understand the needs of an old woman such as a grandmother, thereby making a better buying decision for that targeted consumer.

In addition to information conveyed via multi-media displays an expert facilitator can be present in any or each of the rooms of mobile display 1. An expert facilitator can be a person familiar with both the consumer products and the prospective customer, i.e., the retail seller. The expert facilitator can guide discussions, lead sessions, and generally ensure that communication occurs between the mobile display 1 and the buyers or other customers that are experiencing the mobile display 1. The expert facilitator can ensure that questions are answered, information provided, and that the purchasing representatives get the full experience of the mobile display. In addition, the expert facilitator can lead or guide discussions with respect to joint business planning, vision sharing, technology reviews, and the like.

In general, there is no requirement that the rooms be in the order specified above. That is, the kitchen could be the first room 10, for example. However, it is preferred that the rooms be arranged to provide a certain flow, such as an ordered progression through a woman's stages of life. Therefore, in such an embodiment, four sections or rooms can be used to stress stages of development, with the first being a teenager's bedroom, the second being a clothing store, the third being a kitchen, and the fourth being an older woman's bedroom.

Further, it is clear from the above description of one embodiment, that the mobile display 1 of the present invention can have utility beyond communicating benefits of feminine hygiene articles. For example, the mobile display can have multiple rooms corresponding to the stages of development of babies for the purpose of better communicating the benefits of various diaper and baby care products. As such, first room 10 can be a hospital room, having therein furnishings of a birthing suite, soft music, low lighting, and a changing table suitable for newborn infants, including pre-mature babies. Second room 20 can be a home nursery for infants, the room having a crib, hanging mobiles, a changing table with baby wipes and lotion, a rocking chair, and age-appropriate play toys such as soft animals. Third room 30 can be a play room for crawlers or toddlers, having larger toys appropriate for crawlers or toddlers, books, soft furniture, and a high chair for feeding. Fourth room 40 can be a pre-school room for walkers and older children, the room having larger toys, books, desks, tables, chalk boards, and the like.

Other uses for the present invention can include the communication of benefits and features of various office configurations, such as a showing various office set ups optimized for various functions. For example, a doctor's or dentist's office can be displayed complete with multiple patient rooms and a waiting room. Further, the present invention can be used for showing interior decorating ideas and products, wood or metal shop ideas and products, hotel room ideas and products. For each, two or more sections or rooms can be outfitted with appropriate sensory cues with respect to the function of the room. For some uses, the rooms can be smaller, such as sections to resemble the interior of an automobile to communicate automobile ideas and products.

The products for which the mobile display 1 of the present invention can be used can include feminine care products, baby care products, oral care products, fabric care products, home care products, pharmaceuticals, bath, facial and absorptive tissue products, beauty care products, medical or dental products, pet care products, food and food preparation products, kitchen and shop appliance products, automotive products, sporting goods products, hardware and building materials products, and the like.

In one embodiment, one of the rooms of the mobile display, or a fifth, dedicated room, can be designed for focusing on regional priorities and/or retailer-specific issues. For example, one room can be adapted for modular arrangement of shelving, storage, display, counter space, and other retailer-specific concerns. Additionally, such things as retailer profitability, inventory management, shipping issues, and the like can be planned and discussed in this room.

All documents cited in the Detailed Description of the Invention are, are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A mobile, multi-room feminine hygiene product display comprising,
   a. a first room, said first room having a first set of sensory cues, said first set of sensory cues communicating to a person a first life stage of a feminine hygiene product user;
   b. a second room, said second room having a second set of sensory cues, said second set of sensory cues communicating to a person a second life stage of a feminine hygiene product user, wherein said second set of sensory cues are substantially different from said first set of sensory cues; and
   c. wherein said first and second rooms are designed to be cratable or palletizeable.

2. The mobile display of claim 1, wherein said sensory cues in each of said first and second rooms are chosen to be relevant to a predetermined category of a population.

3. The mobile display of claim 2, wherein said population is a population of adult females.

4. The mobile display of claim 2, wherein said predetermined category is chosen from the group consisting of pre-teen and early teen girls at the onset of menstruation, young, childless women, and mothers and older women.

5. The mobile display of claim 2, wherein said sensory cues in each of said first and second rooms are chosen to be relevant to a progression of life stages in said predetermined category of a population.

6. The mobile display of claim 1, wherein said first and second rooms are connected by a common doorway.

7. The mobile display of claim 1, wherein said first sensory cues include visual cues chosen from the group consisting of a bed, an un-made bed, hanging clothing in a closet, clothing on said bed or on a floor, pictures, posters, mirrors, compact discs, a music system, a video display means, a computer, a desk, incandescent lighting, and a mirror.

8. The mobile display of claim 1, wherein said first sensory cues include visual cues chosen from the group consisting of a refrigerator, an oven, a table and chairs, a sink, cleaning supplies, a food pantry, a dishwasher, tile flooring, hardwood flooring, linoleum flooring, fluorescent lighting, and a curtained window.

9. The mobile display of claim 1, wherein said first sensory cues include visual cues chosen from the group consisting of a rack of hanging clothing, shelves of folded clothes, pictures of models modeling clothing, racks of hanging accessories, display counters containing items for sale, wall advertising, posters, and fitting rooms.

10. The mobile display of claim 1, further comprising a third room, said third room having a third set of sensory cues substantially different from said first and second sets of sensory cues.

11. The mobile display of claim 1, further comprising a fourth room, said fourth room having a fourth set of sensory cues substantially different from said first, second and third sets of sensory cues.

12. A mobile, multi-room feminine hygiene product display for displaying and communicating benefits of feminine hygiene products comprising,
   a. a first room, said first room having a first set of sensory cues, said first set of sensory cues communicating to a person a first life stage of a feminine hygiene product user;
   b. a second room, said second room having a second set of sensory cues substantially different from said first set of sensory cues, said second set of sensory cues communicating to a person a second life stage of a feminine hygiene product user;

c. a third room, said third room having a third set of sensory cues, said third set of sensory cues communicating to a person a third life stage of a feminine hygiene product user, wherein the third set of sensory cues are substantially different from said first and second set of sensory cues;

d. said first sensory cues including visual cues chosen from the group consisting of a bed, an un-made bed, hanging clothing in a closet, clothing on said bed or on a floor, pictures, posters, mirrors, compact discs, a music system, a video display means, a computer, a desk, incandescent lighting, and a mirror;

e. or said first sensory cues including visual cues chosen from the group consisting of a refrigerator, an oven, a table and chairs, a sink, cleaning supplies, a food pantry, a dishwasher, tile flooring, hardwood flooring, linoleum flooring, fluorescent lighting, and a curtained window;

f. or said first sensory cues including visual cues chosen from the group consisting of a rack of hanging clothing, shelves of folded clothes, pictures of models modeling clothing, racks of hanging accessories, display counters containing items for sale, wall advertising, posters, and fitting rooms; and g. wherein said mobile, multi-room display is cratable or palletizeable.

13. The mobile, multi-room display of claim 12, wherein said sensory cues in each of said first, second and third rooms are chosen to be relevant to a progression of life stages in a predetermined category of a population.

* * * * *